US012803068B2

(12) United States Patent
Khawand et al.

(10) Patent No.: US 12,803,068 B2
(45) Date of Patent: Nov. 17, 2026

(54) BATTERY SYSTEM WITH EMBEDDED CHARGING COIL

(71) Applicant: Microsoft Technology Licensing, LLC, Redmond, WA (US)

(72) Inventors: Charbel Khawand, Sammamish, WA (US); Apoorva Sharma, Sammamish, WA (US); Andrew James Hillenius, Woodinville, WA (US); Jeffrey D. Bruce, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 706 days.

(21) Appl. No.: 18/321,095

(22) Filed: May 22, 2023

(65) Prior Publication Data

US 2024/0396106 A1 Nov. 28, 2024

(51) Int. Cl.
*H01M 10/46* (2006.01)
*G05D 23/24* (2006.01)
(Continued)

(52) U.S. Cl.
CPC ....... *H01M 10/46* (2013.01); *H01M 10/4257* (2013.01); *H01M 10/486* (2013.01);
(Continued)

(58) Field of Classification Search
CPC ............ H01M 10/46; H01M 10/4257; H01M 10/486; H01M 2010/4271; H02J 50/12; H02J 50/005; G05D 23/24
(Continued)

(56) References Cited

U.S. PATENT DOCUMENTS 7,223,486 B2 * 5/2007 Dorren .................... H01R 4/02 320/136
8,460,816 B2 * 6/2013 Julstrom .............. H01M 10/46 429/93
(Continued)

FOREIGN PATENT DOCUMENTS

CN 114784897 A 7/2022
KR 101469463 B1 * 12/2014 ................ H02J 7/61
(Continued)

OTHER PUBLICATIONS

Pathare, Niranjan; “Texas Instruments White Paper”, 2013, All pages (Year: 2013).*
(Continued)

*Primary Examiner* — Suresh Memula
(74) *Attorney, Agent, or Firm* — Holzer Patel Drennan

(57) ABSTRACT

A battery system for an electronic device includes a rechargeable battery component, an induction coil, circuitry, a ferrite layer, and a cover. The induction coil is mounted on a side of the rechargeable battery component and electrically connected to a charging terminal of the battery. The circuitry is connected to the induction coil and the charging terminal of the rechargeable battery component and is configured to manage current flow and voltage levels between the induction coil and the rechargeable battery component. The cover is formed of a dielectric material and encapsulates the rechargeable battery component, the induction coil, and the circuitry. A ferrite layer is optionally interposed between the induction coil and the rechargeable battery component.

20 Claims, 5 Drawing Sheets

(51) Int. Cl.
*H01M 10/42* (2006.01)
*H01M 10/48* (2006.01)
*H02J 50/00* (2016.01)
*H02J 50/12* (2016.01)

(52) U.S. Cl.
CPC ............ *H02J 50/005* (2020.01); *H02J 50/12* (2016.02); *G05D 23/24* (2013.01); *H01M 2010/4271* (2013.01)

(58) Field of Classification Search
USPC .......................................................... 320/114
See application file for complete search history.

(56) References Cited

U.S. PATENT DOCUMENTS

2011/0086256 A1* 4/2011 Julstrom ............... H01M 10/46 429/121
2012/0256585 A1* 10/2012 Partovi ................. H02J 50/005 320/108
2014/0042961 A1* 2/2014 Lan ..................... H01M 10/425 429/61
2015/0123604 A1* 5/2015 Lee ......................... H01F 27/36 428/307.3
2016/0013680 A1* 1/2016 Liang ........................ H02J 7/70 320/108
2016/0190856 A1* 6/2016 Baek ....................... H04W 4/80 320/108
2018/0006473 A1* 1/2018 Bessegato ................. H02J 7/61
2019/0369154 A1* 12/2019 Voisine .................. G01R 31/67
2020/0266667 A1 8/2020 Lee
2021/0313838 A1 10/2021 Spinella
2022/0271568 A1* 8/2022 Cordier ..................... H02J 7/02
2022/0416592 A1 12/2022 Sugihara

FOREIGN PATENT DOCUMENTS

KR 20190000687 A 1/2019
KR 102472232 B1 * 11/2022 ................ H02J 7/70
KR 102732914 B1 * 11/2024 ................ H02J 7/94
TW M419329 U * 12/2011

OTHER PUBLICATIONS

International Preliminary Report on Patentability (Chapter I) received for PCT Application No. PCT/US2024/028221, mailed on Dec. 4, 2025, 08 pages.
International Search Report and Written Opinion received for PCT Application No. PCT/US2024/028221, Aug. 12, 2024, 14 pages.

* cited by examiner

BATTERY SYSTEM WITH EMBEDDED CHARGING COIL

BACKGROUND

Many electronic devices today utilize some form of wireless technology to transmit and receive information. Such devices typically include one or more antennas that enable wireless signals to be transmitted and received. In addition, many electronic devices are battery powered and include a rechargeable battery. Charging coils are convenient solutions for cordless, inductive charging of such electronic products operating on battery power.

SUMMARY

In some aspects, the techniques described herein relate to a battery system including: a rechargeable battery component; an induction coil mounted on a side of the rechargeable battery component and electrically connected to a charging terminal of the rechargeable battery component; circuitry connected to the induction coil and the charging terminal of the rechargeable battery component configured to manage current flow and voltage levels between the induction coil and the rechargeable battery component; and a cover formed of a dielectric material encapsulating the rechargeable battery component, the induction coil, and the circuitry. A ferrite layer may optionally be interposed between the induction coil and the rechargeable battery component.

In some aspects, the techniques described herein relate to a method for control of a battery system. The battery system includes a rechargeable battery component; an induction coil mounted on a side of the rechargeable battery component and electrically connected to a charging terminal of the rechargeable battery component; circuitry connected to the induction coil and the charging terminal of the rechargeable battery component configured to manage current flow and voltage levels between the induction coil and the rechargeable battery component; and a cover formed of a dielectric material encapsulating the rechargeable battery component, the induction coil, the ferrite layer, and the circuitry. The method performed by the circuitry includes monitoring conditions in a device environment within which the battery system is connected by measuring changes in resistance in the induction coil; and controlling operation of the battery system in response to the conditions of the device environment indicated by the measured changes in resistance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The disclosure will be readily understood by the following detailed description in conjunction with the accompanying drawings.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Figure 1:
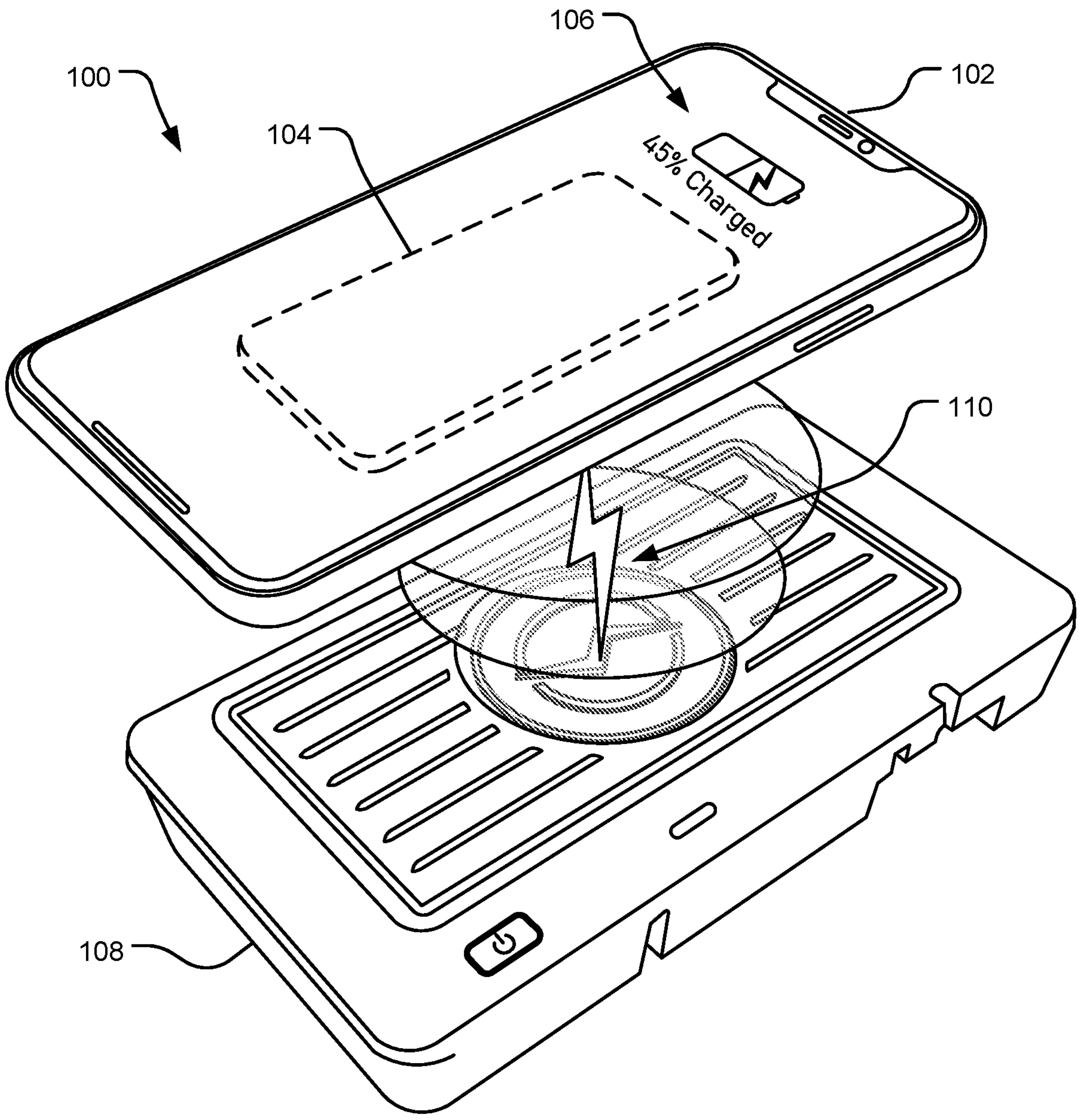
FIG. 1 provides a schematic illustration of an example wireless charging operation for a mobile electronic device including a battery system with an embedded charging coil.

Many electronic devices today operate on battery power. Until recent years, most battery operated electronic devices used disposable batteries that were removed from the electronic devices when the stored charge in the battery was exhausted and new, fully charged batteries were inserted into the electronic devices for continued operation. While rechargeable batteries existed, they were expensive, not very powerful, short lived, and their recharging cycles were low. New rechargeable battery technologies, particularly the lithium-ion battery design helped advance a new era of new electronic devices with greater power requirements, longer lifespans, and greater recharging cycles. Such electronic devices include, for example, digital cameras, video cameras, wireless loudspeakers, tablet computers, laptop computers, mobile phones, and smartphones.

The batteries in these electronic devices have been typically recharged using a charging cable that plugs into the electronic device at one and is connected to an AC-DC converter plugged into an AC power outlet. With this charging configuration, there is no need to remove the battery from the electronic device for charging or replacement, particularly if the cycle life for recharging is in the thousands of cycles. Thus, some electronic devices fully seal the battery within the device enclosure as a design choice understanding that removal and replacement, if necessary, may be difficult.

While induction and inductive energy transfer is a well-known aspect of electrical theory and has long been used in circuit designs, it is only more recently that inductive charging has become a viable option for electronic devices with lithium-ion battery designs. Inductive charging transfers electrical power between the charger and the battery in an electronic device wirelessly by "inducing" current flow through the generation of an electromagnetic field.

When current flows through the coil in the charging base, it creates a magnetic field. When the coil in the electronic device is placed within the magnetic fields generated by the charging base, electric current is induced within the coil, which is then filtered by corresponding electronic circuitry and transferred to the rechargeable battery to charge it. To implement an effective inductive charging system, both the charging base and the electronic device need corresponding electromagnetic wire coils with generally compatible power specifications.

Charging occurs when the coil in the electronic device is within the magnetic field generated by the charging base. The strength (magnitude) of the induced magnetic field is inversely proportional to the distance away from the wire coil in the charging base. Thus, the magnetic field strength reduces the further the electronic device is from the charging base, and ultimately to zero as the distance sufficiently increases. As the voltages used by the electronic devices are low, the strength of the magnetic field dissipates quickly, i.e., within a few centimeters. For example, the most implemented of the wireless charging standards—Qi (pronounced "chee"), developed by the Wireless Power Consortium (WPC)—enables inductive base-type charging at a short-distance (1.5 cm or less). Coil size also affects the distance of power transfer. The larger the diameter of the wire forming the coil, or the more coils there are, the greater the distance a charge can travel.

An example of an inductive charging system 100 for an electronic device 102, e.g., a smartphone, is depicted in FIG. 1. As depicted, the electronic device 102 has an internal battery 104. For charging, the electronic device 102 is placed on top of, or in close proximity to, a wireless charging base 108, such as a flat pad as depicted. The wireless charging base 108 is plugged into an AC power outlet and includes a AC-DC power converter. However, the wireless charging base 108 further includes inductive circuitry including a conductive coil that creates a magnetic field 110 capable of transferring power between the wireless charging base 108 and the electronic device 102. As indicated in FIG. 1, the electronic device 102 enters a charging mode 106 when moved within the magnetic field 110 and the battery 104 recharges as long as the electronic device 102 remains within the magnetic field 110.

Wireless charging using inductive coils is a convenient option for use with consumer electronic devices on battery power. However, challenges arise in the integration of a large receiver charging coils, or flex coils (flexible printed circuits containing integral inductive coils), with the main circuit board of an electronic device with its analog circuitry and matching network. As noted above, greater power transfer is achieved as both the area of the receiver coil and the diameter of the receiver coil in the electronic device increase. Surface area for inclusion of a receiver coil on a main circuit board is limited, thus, limiting effective power transfer. Additionally, the effectiveness of flex receiver coils, while potentially simultaneously larger in surface area than a receiver coil on a circuit board and space saving because of their thin profile, also suffers due to the small cross-sectional area of the thin metal strips forming the windings. The receiver coil for each type of electronic device application may have different geometries and/or power requirements. Since the receiver coil is a key component in a successful and efficient design of a Qi-compliant receiver coil, and there are many design options and trade-offs to consider, the designer must take a careful and methodical approach when realizing a solution.

In view of the space limitations and design considerations described above, the present disclosure offers an alternative implementation for inclusion of inductive charging soils in electronic devices that can provide for greater coil area, and also greater coil thickness, to improve power transfer from the magnetic field for charging In example implementations, the industrial body of the battery is used as a host for the receiver coil and all its matching circuitry while providing direct charge to the battery independently from any additional routing by the main circuit board of the electronic device. In one example implementation, the receiver coil is positioned between the battery wrapper and a cover for the integrated battery and coil system. In another example implementation, the receiver coil can be manufactured as a part of the battery cover rather than as one or more independent layers within the cover of a battery system.

The example implementations of battery systems disclosed herein provide self-charging capabilities for batteries either while embedded in an electronic device or, in the case of removable batteries, or after removal and placement on of the battery system on a charging station independent from the electronic device. Many electronic devices are battery powered and this design approach may increase the use of charging coils across many product designs that presently choose to omit such use. For example, products like a touch screen stylus can benefit from having a receiver coil as part of the battery wrapper, either to enhance the charge time or to allow for convenient removal of a battery section for placement on a charging station and replacement with an identical, charged battery section to easily continue use of the stylus. Further, many present electronic devices are made using glass or other dielectric materials in a planar form for outer enclosures to allow for inductive charging; metal housings interfere with inductive magnetic fields and prevent wireless charging. Electronic devices with removeable battery systems could use metal housings for increased durability and offer different form factor designs other than planar while still allowing for ease of removal and charging of the battery with an inductive charging base. In addition, some regulatory schemes are moving to require replaceable batteries in electronic devices to increase device longevity, reduce consumer cost for battery replacement, and potentially reduce electronic product waste.

The additional space taken on the circuit board of electronic devices by the traditional receiver coil design can be regained. Use of the battery as the "substrate" for inclusion of a receiver charging coil takes advantage of a large surface area within electronic devices. Rechargeable batteries for electronic devices are typically primarily rectangular and flat. Batteries in laptop computers and tablet computers have quite large planar form factors, sometimes extending across one-third to one-half the planar dimension of such electronic devices. The large, flat form factors of batteries designed for electronic devices provides a significant opportunity to increase the surface area of receiver charging coils and thereby increase the power transfer between a charging base and the electronic device.

Further, the cost and effort to properly chemically match and radio frequency (RF) match a power circuit on the main circuit board for different products can be eliminated. Such can be achieved by providing a battery system with an embedded receiver coil and corresponding charging circuitry part of an integrated battery package. Example implementations of the battery system can include an RF matched charge coil and the battery chemistry can be designed to provide specified output frequency, currents, and voltages for "plug-and-play" inclusion in electronic devices designed with corresponding power requirements. Complicated flex circuit design integration can also be avoided. Further, such battery systems can be designed in different form factors for inclusion in electronic devices of multiple shapes and sizes.

An example implementation of a battery system 200 incorporating the features and benefits described above is schematically presented in FIG. 2. The battery system 200 includes a battery 204, typically a lithium-ion battery, but other types of batteries could be used in the battery system 200. The battery 204, may be coated, covered, or wrapped by a separator layer 206. One of the large, flat sides of the battery 204 may be covered by a ferrite layer 208, e.g., by placement of a metal sheet or by deposition on top of the separator layer 206. A polyimide (PI) layer 212 may be used as a rigid planar structure for supporting two layers of inductive receiver coils, an inner coil 214 and an outer coil 216, e.g., formed of copper wires, wound or coiled in planes each side of the PI layer 212. The inner coil 214 and the outer coil 216 may be connected to each other to form a unitary coil structure by conductive vias formed within the PI layer 212. The PI layer 212 with the attached inner coil 214 and outer coil 216 may be placed upon and attached to the ferrite layer 208 by an electrically insulating adhesive layer 210 between the ferrite layer 208 and the inner coil 214.

Additionally, in some example embodiments, antenna traces (e.g., copper or other conductive traces formed by printed circuit board (PCB) fabrication methods) may be formed on the opposing surfaces of the PI layer 212 as further described below. For the purposes of FIG. 2, the antenna traces are considered part of the layers of the inner coil 214 and outer coil 216, respectively, as indicated. The antenna traces may function as a communication antenna for one or more wireless communication protocols or for charging the battery 204 under an alternate wireless charging scheme as further described below.

The battery system 200 may further include a battery control module 220 that is electrically connected to each of the inner coil 214, the outer coil 216, and electrodes of the battery 204. The battery control module 220 provides circuitry for multiple functions to manage the charging, output, and proper operation of the battery system 200 as further described below. The battery control module 220 may further provide a data transfer interface (e.g., an Inter-Integrated Circuit (I2C) port) for transferring communications to and from the antenna traces when operating in a wireless communication mode as further described below.

Figure 2:
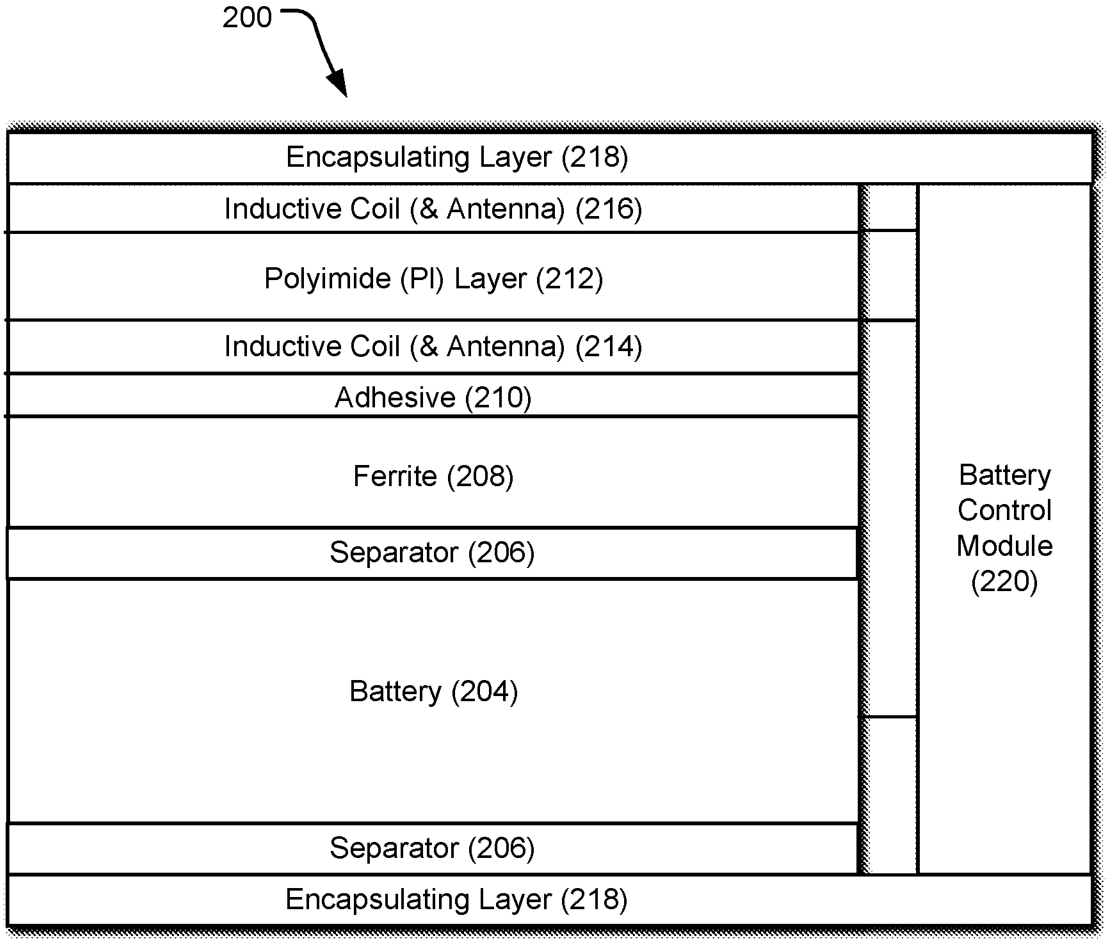
FIG. 2 provides a schematic illustration of an example embodiment of a battery system with an embedded charging coil and a corresponding control module as layers in cross section.

The stack of layers of the battery system 200 described above, as well as the battery control module 220, may then be encapsulated by a dielectric encapsulating layer 218. The encapsulating layer 218 may be a plastic or other dielectric material formed as a coating, an overmold, or a separately formed sleeve or pocket into which the interior layers of the battery system 200 as depicted in FIG. 2 may be inserted. The encapsulating layer 218 secures the components of the battery system 200 together in a final form factor designed for insertion within the housing of an electronic device 102 and simple connection by leads or a wiring chassis as the power source therefor.

As noted above, metal layers such as a metal housing, can interfere with the magnetic field and prevent proper inductive charging. With respect to the design of the battery system 200 as depicted in FIG. 2, the battery system 200 would be oriented such that the outer coil 216, the PI layer 212, and the inner coil 214 are proximal to the housing of the electronic device 102 as compared to the ferrite layer 208, i.e., the outer coil 216, the PI layer 212, and the inner coil 214 are positioned between the housing of the electronic device 102 and the ferrite layer 208. In this way, the ferrite layer 208 does not block the magnetic field from a charging base 108 from reaching and interacting with the outer coil 216 and the inner coil 214.

In fact, the ferrite layer 208 is provided to improve the efficacy of charging by the magnetic field. The ferrite layer 208 deflects and bends the magnetic field lines back toward the inner coil 214 and outer coil 216, generally flattening the magnetic field generated by the charging base 108 such that the magnetic field flows more directly through the plane of the inner and outer coils 214, 216, thereby increasing the induced current and power transfer.

Additionally, the ferrite layer 208 shields and protects the battery 204 from the magnetic field, preventing the magnetic field from inducing unwanted current in the metal material sheets or layers (e.g., copper, aluminum, cobalt oxide, etc.) within the battery, which could cause shorting and negatively impact normal function of the battery 204. The thickness of the ferrite layer 208 can be adjusted to increase or decrease the magnetic flux saturation point corresponding to the power of the charging base 108. A thicker ferrite layer 208 can absorb a larger amount of magnetic flux to prevent heating behind the charging coils 214, 216 and thereby shield the battery 204 from environmental heat. Thicker shielding ferrite layers 208 also are less susceptible to drops in efficiency than thinner layers when the electronic device 102 and charging bases 108 are designed with opposing magnets for alignment.

In some implementations, the ferrite layer may be formed within the casing of the battery 204 itself, e.g., within the separator layer 206, with certain caveats. In particular, the battery 204 does not have ground plane (i.e., the negative electrode of the battery 204 is not necessarily ground), thus requiring that the ferrite layer 208 be “floating” if included within the package of the battery 204. Therefore, it may be preferable for the ferrite layer 208 to be formed outside the separator layer 206 for improved charging functionality as described above as well as to ensure that the ferrite layer 208 is isolated/insulated from the electrodes of the battery 204.

In alternate implementations, the charging stack of the battery system 200, i.e., the ferrite layer 208, the PI layer 212, the inner coil 214, and the outer coil 216, could potentially be replicated on an opposing side of the battery 204 on the outer surface of the separating layer 206 and further enclosed within the encapsulating layer 218. In this configuration, multiple similar batteries could be stacked on top of each other on a single charging base 108 for simultaneous charging. The battery control module 220 of each battery system 200 can be configured to manage energy flow for charging of the battery 204 on the one hand and passing energy flow to the coil stack on the opposite side of the battery 204, which would act as a transmitting inductor to create a magnetic field for charging the next battery in a stack of batteries to charge multiple batteries simultaneously. The battery control module 220 of each battery system 200 can be designed to decide, based on factors (e.g., strength of inductive charging field, charge status of the battery, or interrogation of charge status of an adjacent battery), how much current to flow to the inner coil 214 and the outer coil 216 on the opposing side to charge the next battery in the chain.

Figure 3A:
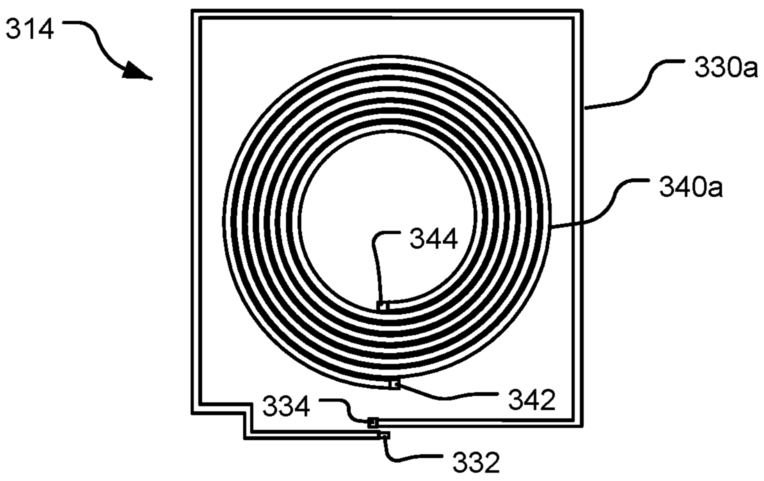
FIG. 3A provides a schematic illustration of an example embodiment of a first coil and antenna layer within the battery system of FIG. 2.
Figure 3B:
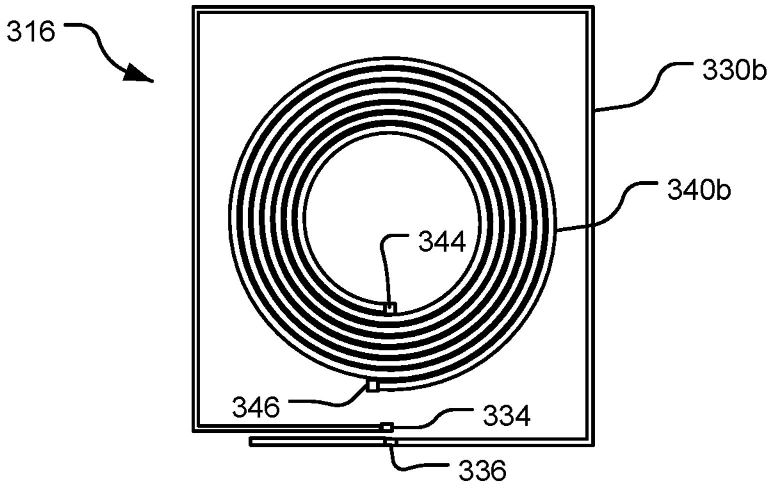
FIG. 3B provides a schematic illustration of an example embodiment of a second coil and antenna layer within the battery system of FIG. 2.

As indicated above, antenna structures may be formed on opposing sides of the PI layer 212 for use by the electronic device 102. For example, as depicted in FIGS. 3A and 3B, one or more antenna traces 330*a*, 330*b* may be included as part of an inner coil layer 314 and an outer coil layer 316, respectively. An inner antenna trace 330*a* may be formed on the same side of the PI layer 212 as the planar inner coil 340*a* and an outer antenna trace 330*b* may be formed on the same side of the PI layer 212 as the planar outer coil 340*b*. The inner antenna trace 330*a* may surround or form a rectangular perimeter about the inner coil 340*a*. Similarly, the outer antenna trace 330*b* may surround or form a rectangular perimeter about the outer coil 340*b*.

Figure 3C:
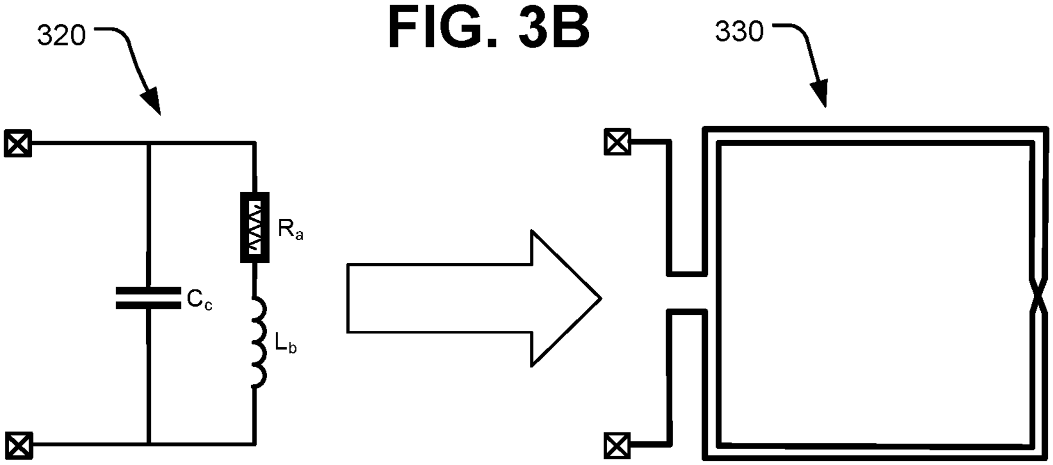
FIG. 3C provides a schematic illustration of an example embodiment of a n equivalent circuit to the antenna layers of FIGS. 3A and 3B.

The perimeter lengths of the inner antenna trace 330*a* and the outer antenna trace 330*b* may depend upon or be chosen for optimal response to and reception of wavelengths of RF signals. In some example embodiments, the antenna 330 may function as a near field communication (NFC) antenna or an antenna for other types of wireless communication protocols. The length and width dimensions of the inner antenna trace 330*a* may be slightly smaller than the length and width dimensions of the outer antenna trace 330*b* (or vice versa) such that together they form an equivalent antenna circuit 320 to the antenna 330 of FIG. 3C.

In the example of FIGS. 3A and 3B, the antenna traces 330*a*, 330*b* are electrically connected together through a first via 334 within the PI layer 212. The inner antenna trace 330*a* may also include a first contact 332 that is connected to a corresponding electrical trace on the PI layer 212 that is ultimately connected to the battery control module 220. The outer antenna trace 330*b* may also include a second contact 336 that is connected to a corresponding electrical trace on the PI layer 212 that is ultimately connected to the battery control module 220.

Incorporation of the antenna traces 330*a*, 330*b* to form a wireless communication antenna, e.g., for NFC, provides several advantages to traditional antenna design in electronic devices 102. First, the surface area available on the surface of the battery 204 is much larger than the area typically allotted on a circuit board. Increasing the size of the loop of the antenna traces 330*a*, 330*b* improves the functionality of NFC communication in particular. Second, the integration electronic contacts of the antenna traces 330*a*, 33*b* through the PI layer 212 and connection to the battery control module 220 avoids the use of spring contacts and the corresponding precise alignment needed when using flex antennas. As noted, data transfer between the antenna traces 330*a*, 330*b* and other components of the electronic device 102 can be easily managed through an $I^2C$ port or similar data port connection provided by the battery control module 220.

Similarly, the receiver coils 340*a*, 340*b* are electrically connected together through a second via 344 within the PI layer 212. The inner coil 340*a* may also include a third contact 342 that is connected to a corresponding electrical trace on the PI layer 212 that is ultimately connected to the battery control module 220. The outer coil 340*b* may also include a fourth contact 346 that is connected to a corresponding electrical trace on the PI layer 212 that is ultimately connected to the battery control module 220.

In addition to operating as an NFC antenna 330, in some implementations, the antenna traces 330*a*, 330*b* may also be used as charging coils that can allow the electronic device 102 to be charged without being placed on or very near a charging base 108. In such an implementation, the battery of the electronic device 102 could be charged sitting anywhere, while moving around, and while in use. A magnetic loop antenna within the vicinity of the electronic device 102 can be used to create an oscillating electromagnetic field, which can create a current in the antenna traces 330*a*, 330*b*. If the appropriate capacitance is provided in the antenna design, e.g., as suggested by equivalent antenna circuit 320, so that the loop of antenna traces 330*a* resonates at the same frequency as the loop of antenna trace 330*b*, the amount of induced current in the antenna 330 as a whole increases. This form of resonant inductive charging enables power transmission at greater distances between a transmitter and the receiving antenna 330 with increased efficiency. The circuit design of the battery control module 220 of the battery system 200 in FIG. 2 may be configured to respond to such resonant induced current within the antenna 330, e.g., when the antenna 330 is not in use for communication purposes, and direct such current to charge the battery 204. Notably, such resonant inductive charging is at a much lower power level (e.g., about 1 watt per the Qi standard) than wireless conductive charging through a charging base 108 and is akin to trickle charging of the battery 204.

As indicated above, the battery control module 220 provides circuitry for multiple functions to manage the charging, output, and proper operation of the battery system 200. In addition to management of current in the antenna 300, the battery control module 220 may condition the charging current generated in the coils to meet design characteristics of the battery 204 and ensure optimal charging. The circuitry in the battery control module 220 may provide impedance matching for the inner coil 214 and the outer coil 216 designs based upon coil length and wire gauge to maximize power transfer. As another example, if the battery 204 is already adequately charged, the battery control module 220 can block incoming charge to the battery and, in some instances, divert adequate inductive current generated to power the electronic device 102 directly. In other implementations, the battery control module 220 could create a trickle charge to maintain the full charge level.

In another example implementation, the battery control module 220 may include circuitry for detecting whether the electronic device 102 to which the battery system 200 is connected is appropriate for the amperage and voltage output specifications of the battery 204, particularly if the battery system 200 is designed to be removable. If the battery control module 220 detects, e.g., by performing current matching diagnostics upon installation, that the electronic device 102 is not compatible, the circuitry of the battery control module 220 can prevent discharge of the battery 204. Similarly, if the battery system 200, either separately or while installed within an electronic device 102, is placed upon an incompatible charging base 108, the circuitry of the battery control module 220 can be designed to prevent a charging session that could damage the battery 204. The battery control module 220 can similarly be used to provide security control. For example, the battery control module 220 could be provided with an encrypted key that limits the interface or operation of the battery system 220 to electronic devices 102 or charging bases 108 with a corresponding key.

In a further example implementation, the battery control module 220 may be configured to allow the battery 204 to discharge through the inner coil 214 and the outer coil 216 to create a magnetic field and charge another battery, either of a similar design as a system with an integrated coil or within another electronic device that provides for wireless inductive charging. An interface on the electronic device 102 could be used to switch the operation of the battery system 200 via the battery control module 220 to a discharge mode for charging another battery or device.

In another example implementation, the battery control module 220 can provide circuitry for tuning the antenna 330 to match one or more frequencies of wireless communication networks (e.g., NFC) to ensure signal reception and transmission within protocol specifications. The circuitry of the battery control module 220 can be designed to boost power for transmission and reduce signal loss.

In a further example implementation, the battery control module 220 may monitor the internal temperature of the battery system 200, for example, to ensure that the battery 204 does not overheat and operate at reduced effectiveness or, in an extreme case, pose a fire risk. The battery control module 220 can monitor the resistance within the inner coil 214 and the outer coil 216. If the resistance increases above a threshold level, such could indicate overheating of the battery 204 as resistance of copper wire increases with rising temperature. In this way, the circuitry of the battery control module 220 can be designed to monitor temperature within the battery system 200 without need for a separate thermocouple. If significant overheating is detected, the battery control module 220 could be designed to prevent further charging and discharging of the battery 204 and provide an indication of the problem through a software application interface in the electronic device 102 if available.

In a related example implementation, the battery control module 220 may further monitor the resistance within the inner coil 214 and the outer coil 216 for indications of possible swelling or bulging of the battery 204. Battery swelling is a potentially dangerous condition indicating too much current inside a cell of the battery 204, which causes a build-up of heat and gas. If the pressure becomes too great, the packaging around the battery 204, including the separator layer 206 in the battery system 200 could split or breach and battery chemicals could be released into the electronic and gases could be released in to the air. In an extreme situation, the battery 204 could explode. Recalling that the inner coil 214 and outer coil 214 are planar in construction, if the battery 204 swells, the charging coils 214, 216 may be pushed or bowed outward, thereby slightly stretching the length of the copper wire forming the charging coils 214, 216. The circuitry of the battery control module 220 can be designed to monitor for changes in resistivity through the charging coils 214, 216 outside of nominal ranges and indicative of increased wire length through stretching and, thus, potential swelling of the battery 204. If such is detected, the battery control module 220 could be designed to prevent further charging and discharging of the battery and provide an indication of the problem through a software application interface in the electronic device 102 if available.

Figure 4:
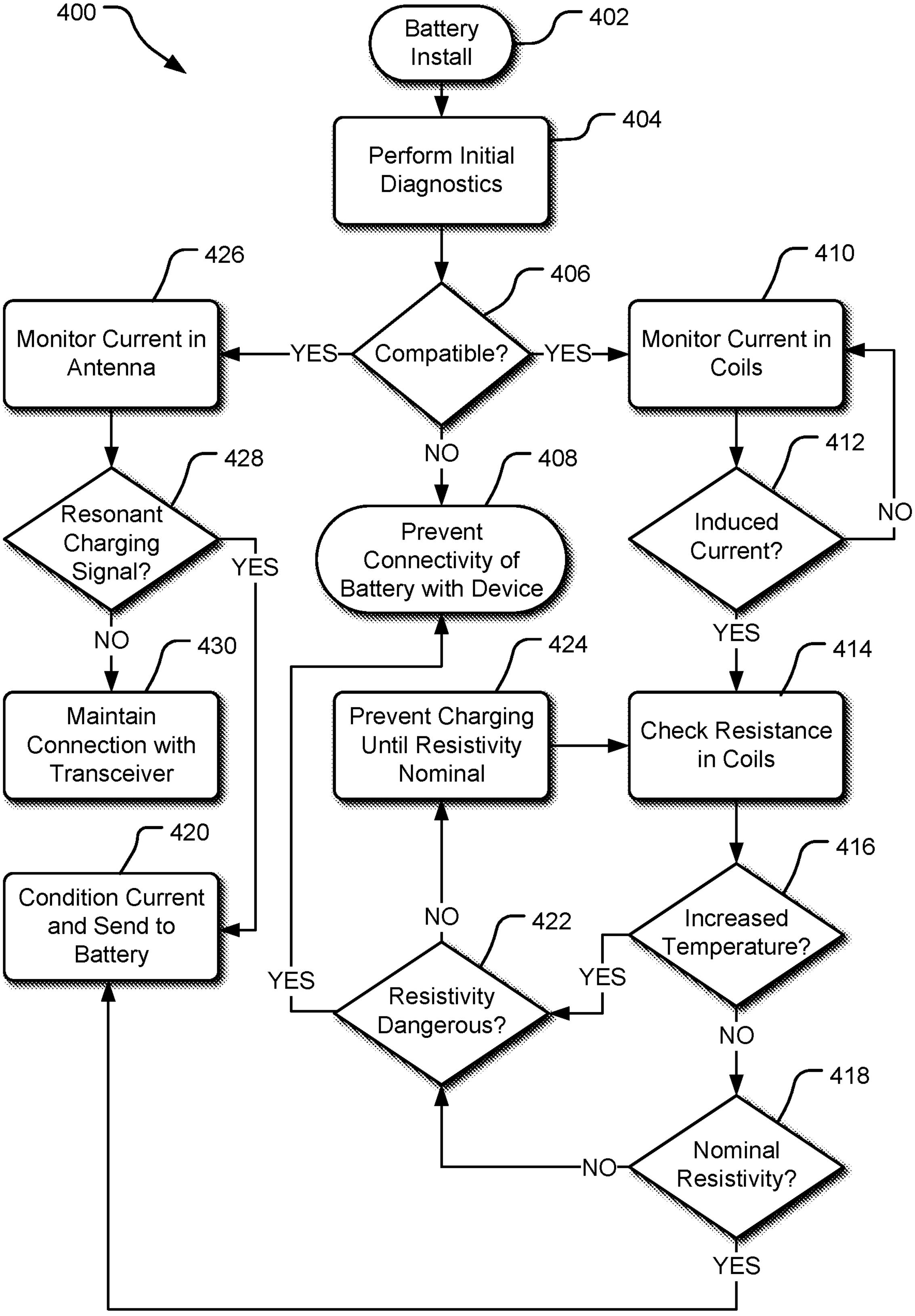
FIG. 4 provides a schematic illustration of an example embodiment of a process for managing the battery system of FIG. 2.

FIG. 4 is a flow diagram depicting an example method 400 for providing management of some of the example, optional, functionality of the battery control module 220 described above. Upon installation 402 of a battery system 200 within an electronic device 102, in an initial diagnostic operation 404, the battery control module 220 may perform one or more diagnostics, including to check for compatibility with the electronic device 102. As discussed above, the battery control module 220 may also be designed with security protocols restricting operability to connection only with devices having reciprocal security credentials. As indicated in determination operation 406, the battery control module 220 checks for compatibility with the electronic device 102. If the battery system 200 is compatible with the electronic device 102, the battery control module 220 follows two functional paths related separately to the charging coils 214, 216 and the antenna 330. If incompatibility with the electronic device 102 is detected, the battery control module 220 may prevent connectivity of the battery system 200 with the electronic device as indicated in prevention operation 408.

Following the functional path related to the charging coils 214, 216, the battery control module 220 monitors for current in the charging coils 214, 216 as indicated in monitoring operation 410. As indicated in determination operation 412, if an insignificant amount of induced current is detected within the charging coils 214, 216, such suggests that the battery is not within a charging magnetic field and the functional flow returns to the monitoring operation 410. If the induced current indicates a charging environment, the battery control module 220 moves to a resistance monitoring state 414 and monitors the resistance in the charging coils 214, 216. If the resistance measurement does not indicate overheating, the logic flows to determination operation 418 in which the resistance in the charging coils is evaluated for departure from nominal levels which could indicate swelling of the battery 204. If it is determined that resistivity is nominal, then the induced current in the charging coils is conditioned by the battery control module 220 and sent to the battery 204 for charging as indicated in conditioning operation 420.

In contrast, if increased temperature in the battery system 200 is detected in determination operation 416 through resistance levels in excess of a threshold, the logic moves to determination operation 422 to determine whether the resistivity measurement in the charging coils 214, 216 indicates a dangerous temperature level. If the temperature level is merely elevated, but not dangerous, the battery control module 220 may move to a restriction operation 424 in which charging of the battery 204 is restricted until resistivity in the charging coils 214, 216 returns to a nominal level. In this case, functional operation returns to the resistance monitoring state 414. However, if the resistivity indicates a potentially dangerous temperature condition, the battery control module 220 may electrically disconnect the battery 204 from the electronic device 102 and prevent charging of the battery 204 from the induced current in the coils 214, 216 as indicated in prevention operation 408.

Similarly, if in determination operation 418 abnormal resistivity is detected suggesting potential swelling in the battery 204, the logic moves to determination operation 422 to determine whether the resistivity measurement in the charging coils 214, 216 indicates a dangerous pressure level. If the pressure level is merely elevated, but not dangerous, the battery control module 220 may move to a restriction operation 424 in which charging of the battery 204 is restricted until resistivity in the charging coils 214, 216 returns to a nominal level. In this case, functional operation returns to the resistance monitoring state 414. However, if the resistivity indicates a potentially dangerous pressure condition, the battery control module 220 may electrically disconnect the battery 204 from the electronic device 102 and prevent charging of the battery 204 from the induced current in the coils 214, 216 as indicated in prevention operation 408.

Returning to determination operation 406 and following the functional path related to the antenna 330, the battery control module 220 monitors for current in the antenna 330 as indicated in monitoring operation 410. The default status for the antenna 330 is typically for use in wireless communications. However, if no communications operations are being performed, the battery control module 220 may monitor for resonant charging signals on the antenna 330. If a resonant charging signal is detected in determination operation 428, the battery control module 220 may determine that the battery system is within a long-range wireless charging environment and condition the current generated in the antenna 330 and send it to the battery 204 for charging as indicated in conditioning operation 420. However, if no resonant charging signal is detected in determination operation 428, then the battery control module 220 maintains connection between the antenna 330 and a corresponding transceiver in the electronic device 102 to enable wireless communication as indicated in maintaining operation 430.

Figure 5:
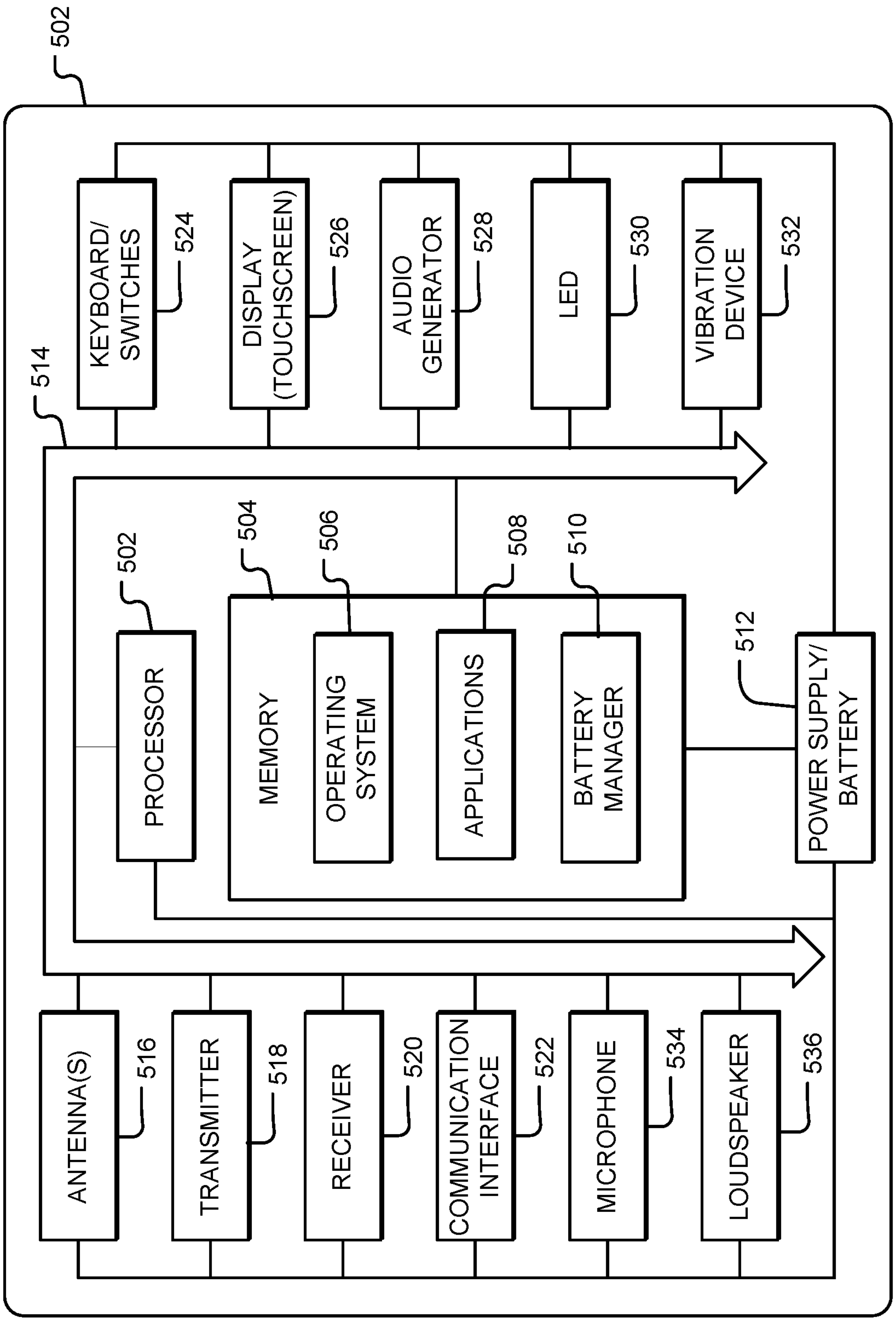
FIG. 5 provides a schematic illustration of an example of a mobile electronic device incorporating a battery with an embedded charging coil.

An example implementation of a mobile electronic device 500 in which a battery system with an embedded charging coil may be used is depicted in FIG. 5. The mobile electronic device 500 includes a processor 502, memory 504, and a power supply 512 as in any standard computing device. In the case of a mobile electronic device 500, the power supply 512 is a battery. The processor 502, memory 504, battery 512 and other components hereinafter described may interface via a system bus 514. The system bus 514 may be any of several types of bus structures including a memory bus or memory controller, a peripheral bus, a switched fabric, point-to-point connections, and a local bus. The memory 504 generally includes both volatile memory (e.g., RAM) and non-volatile memory (e.g., ROM, flash or solid state memory, or a PC Card). An operating system 506 may reside in the memory 504 and execute on the processor 502. Exemplary operating systems include the Android™ operating system from Google® and the iOS operating system from Apple®.

One or more application programs 508 may be loaded into the memory 504 for execution by the processor 502 in conjunction with the operating system 506. Exemplary applications may include electronic mail programs, scheduling programs, personal information management programs, word processing programs, spreadsheet programs, Internet browser programs, music file management programs, and photograph and video file management programs. The memory 504 may further include a battery management application 510, which executes on the processor 502. The battery management application 510 may handles power management during charging sessions and process sensed environmental data (e.g., temperature, swelling) to ensure optimal functionality of the battery as described elsewhere.

As noted, the power supply 512 may be implemented using one or more batteries. In some mobile electronic devices 500, e.g., smart phones, the battery is typically rechargeable and permanently enclosed within the housing of the mobile electronic devices 500. The power supply 512 may also be provided from an external AC source through the use of a power cord or a powered data transfer cable connected with the mobile electronic device 500 that overrides or recharges the batteries. The power supply 512 is connected to most, if not all, of the components of the mobile electronic device 500 in order for each of the components to operate.

In one embodiment, the mobile electronic device 500 may include communications capabilities. For example, the mobile electronic device 500 may operate as a wireless telephone or smartphone. A wireless mobile electronic device 500 with telephone capabilities generally includes one or more antenna 516, a transmitter 518, and a receiver 520 for interfacing with and providing connectivity to a wireless telephony network (e.g., to mobile phone networks such as LTE, 4G, and 5G), as well as other data communication networks (e.g., Wi-Fi®, GPS). In some embodiments, wireless communication circuitry, including one or more transmitters 518, receivers 520, and antennas 516 may be employed to communicate incoming and outgoing radiofrequency carrier signals on various different frequency bandwidths and utilize different communication protocols. Additionally, the mobile device 500 may include a microphone 534 and loudspeaker 536 in order for a user to telephonically communicate. The loudspeaker 536 may also be in the form of a wired or wireless output port for connection with a wired or wireless earphone or headphone.

The mobile electronic device 500 may connect with numerous other networks, for example, a wireless LAN (WiFi®) network, a wired LAN or WAN, GPRS, Bluetooth®, near-field communications (NFC), UMTS, or any other network via shared or additional antennas 516 and one or more communication interfaces 522. The antenna 516 or multiple antennae may be used for different communication purposes, for example, radio frequency identification (RFID), microwave transmissions and receptions, WiFi® transmissions and receptions, and Bluetooth® and NFC transmissions and receptions.

The mobile electronic device 500 further generally includes some type of user interface. As shown in FIG. 5, the mobile electronic device 500 may have a keyboard and/or switches 524 or other keypad for data entry and a display 526. The keyboard/switches 524 may be a limited numeric pad, a full "qwerty" keyboard, or a combination of both. The keyboard/switches 524 may also include specialty buttons, wheels, track balls, and other interface options, for example, menu selection or navigation keys or telephone function keys. In addition to depicting information, the display 526 may also be a touch screen display that allows for data entry by touching the display screen with the user's finger or a stylus to make input selections via a graphical interface or write letters and numbers directly on the display 526.

The mobile electronic device 500 may also have one or more external notification mechanisms. In the embodiment depicted in FIG. 5, the mobile electronic device 500 includes an audio generator 528, a light emitting diode (LED) 530, and a vibration device 532. These devices may be directly coupled to the power supply 512 and activated for a duration dictated by the various controlling applications 508.

In an example implementation, the techniques described herein relate to a battery system including: a rechargeable battery component; an induction coil mounted on a side of the rechargeable battery component and electrically connected to a charging terminal of the rechargeable battery component; circuitry connected to the induction coil and the charging terminal of the rechargeable battery component configured to manage current flow and voltage levels between the induction coil and the rechargeable battery component; and a cover formed of a dielectric material encapsulating the rechargeable battery component, the induction coil, the ferrite layer, and the circuitry.

In another example implementation, the battery system further includes a ferrite layer interposed between the induction coil and the rechargeable battery component.

In another example implementation of the battery system, the induction coil is further configured as two planar layers of conductive coils. The battery system further includes an insulating layer formed of a dielectric material positioned between the two planar layers of the conductive coils.

In another example implementation of the battery system, the dielectric material forming the insulating layer is a rigid, planar material. The battery system further includes a near field communication (NFC) antenna including a first planar conductive loop formed on a first planar surface of the insulating layer and a second planar conductive loop formed on a second planar surface of the insulating layer opposite the first planar surface. The first planar conductive loop and the second planar conductive loop are electrically connected together and to the circuitry.

In another example implementation of the battery system, the induction coil includes a near field communication (NFC) antenna.

In another example implementation of the battery system, the NFC antenna is further configured as two planar conductive loops. The battery system further includes an insulating layer formed of a dielectric material positioned between the two planar conductive loops.

In another example implementation of the battery system, the circuitry is further configured to monitor for a resonant charging signal on the NFC antenna; and connect the NFC antenna to the rechargeable battery component only upon detection of the resonant charging signal.

In another example implementation, the battery system further includes a separation layer formed of an insulating material and positioned between the rechargeable battery component and the ferrite layer.

In another example implementation of the battery system, the circuitry is further configured to determine a temperature of the battery system based at least in part on measured changes of electrical resistance within the induction coil.

In another example implementation of the battery system, the circuitry is further configured to determine a circumstance of swelling by the rechargeable battery component based at least in part on measured changes of electrical resistance within the induction coil.

In another example implementation of the battery system, the circuitry is further configured to determine a device environment within which the battery system is connected; and control operation of the battery system in response to the device environment.

In another example implementation of the battery system, determination of the device environment by the circuitry further includes determining compatibility of a connected electronic device with electrical outputs of the battery system; and control of operation of the battery system in response to the device environment further includes prevention of operation of the battery system with respect to the connected electronic device if an incompatibility is determined.

In another example implementation of the battery system, determination of the device environment by the circuitry configuration further includes exchange of a first security key with a connected electronic device; and control of operation of the battery system in response to the device environment further includes prevention of operation of the battery system with respect to the connected electronic device if a corresponding second security key of the electronic device is incompatible with the first security key.

In another example implementation of the battery system, the induction coil includes a coil configured according to Qi standards.

In another example implementation of the battery system, the battery system is configured for removable connection with an electronic device and wireless inductive charging without connection to an electronic device.

In an example implementation, the techniques described herein relate to a method for control of a battery system. The battery system includes a rechargeable battery component; an induction coil mounted on a side of the rechargeable battery component and electrically connected to a charging terminal of the rechargeable battery component; circuitry connected to the induction coil and the charging terminal of the rechargeable battery component configured to manage current flow and voltage levels between the induction coil and the rechargeable battery component; a ferrite layer interposed between the induction coil and the rechargeable battery component; and a cover formed of a dielectric material encapsulating the rechargeable battery component, the induction coil, the ferrite layer, and the circuitry. The method is performed by the circuitry and includes monitoring conditions in a device environment within which the battery system is connected by measuring changes in resistance in the induction coil; and controlling operation of the battery system in response to the conditions of the device environment indicated by the measured changes in resistance.

In another example implementation, the method further includes determining a temperature within the battery system based at least in part on a measured change of electrical resistance within the induction coil; and halting current flow to the rechargeable battery component if the temperature exceeds a threshold.

In another example implementation, the method further includes determining a circumstance of swelling of the rechargeable battery component based at least in part on a measured change of electrical resistance within the induction coil: and halting current flow to the rechargeable battery component if the measured change of electrical resistance exceeds a threshold beyond a nominal resistance.

In another example implementation, the method further includes exchanging a first security key with an electronic device connected to the battery system; and preventing operation of the battery system with respect to the electronic device connected to the battery system if a corresponding second security key of the electronic device is incompatible with the first security key.

In another example implementation the induction coil includes a near field communication (NFC) antenna, and the method further includes monitoring for a resonant charging signal on the NFC antenna; and connecting the NFC antenna to the rechargeable battery component only upon detection of the resonant charging signal.

In an example implementation, the techniques described herein relate to a battery system including a rechargeable battery component; an induction coil mounted on a side of the rechargeable battery component and electrically connected to a charging terminal of the rechargeable battery component; circuitry means connected to the induction coil and the charging terminal of the rechargeable battery component configured to manage current flow and voltage levels between the induction coil and the rechargeable battery component; a ferrite layer interposed between the induction coil and the rechargeable battery component; and a cover formed of a dielectric material encapsulating the rechargeable battery component, the induction coil, the ferrite layer, and the circuitry. The circuitry means monitors conditions in a device environment within which the battery system is connected by measuring changes in resistance in the induction coil and controls operation of the battery system in response to the conditions of the device environment indicated by the measured changes in resistance.

In another example implementation, the circuitry means determines a temperature within the battery system based at least in part on a measured change of electrical resistance within the induction coil and halts current flow to the rechargeable battery component if the temperature exceeds a threshold.

In another example implementation, the circuitry means determines a circumstance of swelling of the rechargeable battery component based at least in part on a measured change of electrical resistance within the induction coil and halts current flow to the rechargeable battery component if the measured change of electrical resistance exceeds a threshold beyond a nominal resistance.

In another example implementation, the circuitry means exchanges a first security key with an electronic device connected to the battery system and prevents operation of the battery system with respect to the electronic device connected to the battery system if a corresponding second security key of the electronic device is incompatible with the first security key.

In another example implementation the induction coil includes a near field communication (NFC) antenna, and the circuitry means further monitors for a resonant charging signal on the NFC antenna and connects the NFC antenna to the rechargeable battery component only upon detection of the resonant charging signal.

The terms "module," "program," and "engine" may be used to describe one or more of a hardware component, a software process, or a combination of both, implemented to perform a particular function. It will be understood that different modules, programs, and/or engines may be instantiated from the same application, service, code block, object, library, routine, script, application program interface (API), function, etc. Likewise, the same module, program, and/or engine may be instantiated by different applications, services, code blocks, objects, routines, APIs, functions, etc. When incorporating software, the terms "module," "program," and "engine" may encompass individual or groups of executable files, data files, libraries, drivers, scripts, database records, etc. It may be appreciated that a "service," as used herein, is an application program executable across one or multiple user sessions. A service may be available to one or more system components, programs, and/or other services. In some implementations, a service may run on one or more server computing devices.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

The logical operations making up implementations of the technology described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language. Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. Moreover, the separation of various system components in the implementations described above should not be understood as requiring such separation in all implementations.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the structures disclosed herein, and do not create limitations, particularly as to the position, orientation, or use of such structures. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a thorough description of the structure and use of exemplary embodiments of the invention as defined in the claims. Although various embodiments of the claimed invention have been described above with a certain degree of particularity, or with reference to one or more individual embodiments, other embodiments using different combinations of elements and structures disclosed herein are contemplated, as other iterations can be determined through ordinary skill based upon the teachings of the present disclosure. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A battery system comprising:

a rechargeable battery component;

an induction coil mounted on a side of the rechargeable battery component and electrically connected to a charging terminal of the rechargeable battery component;

circuitry connected to the induction coil and the charging terminal of the rechargeable battery component configured to manage current flow and voltage levels between the induction coil and the rechargeable battery component; and a cover formed of a dielectric material encapsulating the rechargeable battery component, the induction coil, and the circuitry, wherein the rechargeable battery component supports the induction coil as a structural substrate that maintains the induction coil in a fixed spatial relationship relative to the rechargeable battery component, and the induction coil and the circuitry are disposed within the cover as an integrated battery package.

2. The battery system of claim 1 further comprising a ferrite layer interposed between the induction coil and the rechargeable battery component.

3. The battery system of claim 1, wherein the induction coil is further configured as two planar layers of conductive coils; and the battery system further comprises an insulating layer formed of a dielectric material positioned between the two planar layers of the conductive coils.

4. The battery system of claim 3, wherein the dielectric material forming the insulating layer is a rigid, planar material; and the battery system further comprises:

a near field communication (NFC) antenna comprising:

a first planar conductive loop formed on a first planar surface of the insulating layer; and a second planar conductive loop formed on a second planar surface of the insulating layer opposite the first planar surface; and wherein the first planar conductive loop and the second planar conductive loop are electrically connected together and to the circuitry.

5. The battery system of claim 1, wherein the induction coil comprises a near field communication (NFC) antenna.

6. The battery system of claim 4, wherein the NFC antenna is further configured as two planar conductive loops; and the battery system further comprises an insulating layer formed of a dielectric material positioned between the two planar conductive loops.

7. The battery system of claim 4, wherein the circuitry is further configured to monitor for a resonant charging signal on the NFC antenna; and connect the NFC antenna to the rechargeable battery component only upon detection of the resonant charging signal.

8. The battery system of claim 2 further comprising a separation layer formed of an insulating material and positioned between the rechargeable battery component and the ferrite layer.

9. The battery system of claim 1, wherein the circuitry is further configured to determine a temperature of the battery system based at least in part on measured changes of electrical resistance within the induction coil.

10. The battery system of claim 1, wherein the circuitry is further configured to determine a circumstance of swelling by the rechargeable battery component based at least in part on measured changes of electrical resistance within the induction coil.

11. The battery system of claim 1, wherein the circuitry is further configured to determine a device environment within which the battery system is connected; and control operation of the battery system in response to the device environment.

12. The battery system of claim 11, wherein determination of the device environment by the circuitry further includes determining compatibility of a connected electronic device with electrical outputs of the battery system; and control of operation of the battery system in response to the device environment further includes prevention of operation of the battery system with respect to the connected electronic device if an incompatibility is determined.

13. The battery system of claim 12, wherein determination of the device environment by the circuitry configuration further includes exchange of a first security key with a connected electronic device; and control of operation of the battery system in response to the device environment further includes prevention of operation of the battery system with respect to the connected electronic device if a corresponding second security key of the connected electronic device is incompatible with the first security key.

14. The battery system of claim 1, wherein the induction coil comprises a coil configured according to Qi standards.

15. The battery system of claim 1, wherein the battery system is configured for removable connection with an electronic device and wireless inductive charging without connection to an electronic device.

16. A method for control of a battery system, the battery system comprising:

a rechargeable battery component;

an induction coil mounted on a side of the rechargeable battery component and electrically connected to a charging terminal of the rechargeable battery component;

circuitry connected to the induction coil and the charging terminal of the rechargeable battery component configured to manage current flow and voltage levels between the induction coil and the rechargeable battery component;

a ferrite layer interposed between the induction coil and the rechargeable battery component; and a cover formed of a dielectric material encapsulating the rechargeable battery component, the induction coil, the ferrite layer, and the circuitry, wherein the rechargeable battery component supports the induction coil as a structural substrate that maintains the induction coil in a fixed spatial relationship relative to the rechargeable battery component and the induction coil and the circuitry are disposed within the cover as an integrated battery package;

the method performed by the circuitry and comprising monitoring conditions in a device environment within which the battery system is connected by measuring changes in resistance in the induction coil to yield measured changes in resistance; and controlling operation of the battery system in response to the conditions of the device environment indicated by the measured changes in resistance.

17. The method of claim 16 further comprising determining a temperature within the battery system based at least in part on a measured change of electrical resistance within the induction coil; and halting current flow to the rechargeable battery component if the temperature exceeds a threshold.

18. The method of claim 16 further comprising:

determining a circumstance of swelling of the rechargeable battery component based at least in part on a measured change of electrical resistance within the induction coil; and halting current flow to the rechargeable battery component if the measured change of electrical resistance exceeds a threshold beyond a nominal resistance.

19. The method of claim 16 further comprising:

exchanging a first security key with an electronic device connected to the battery system; and preventing operation of the battery system with respect to the electronic device connected to the battery system if a corresponding second security key of the electronic device is incompatible with the first security key.

20. The method of claim 16, wherein the induction coil comprises a near field communication (NFC) antenna; and the method further comprises:

monitoring for a resonant charging signal on the NFC antenna; and connecting the NFC antenna to the rechargeable battery component only upon detection of the resonant charging signal.

* * * * *